March 19, 1929.  W. E. MENZIES  1,705,672
REGULATOR SYSTEM
Filed June 14, 1923
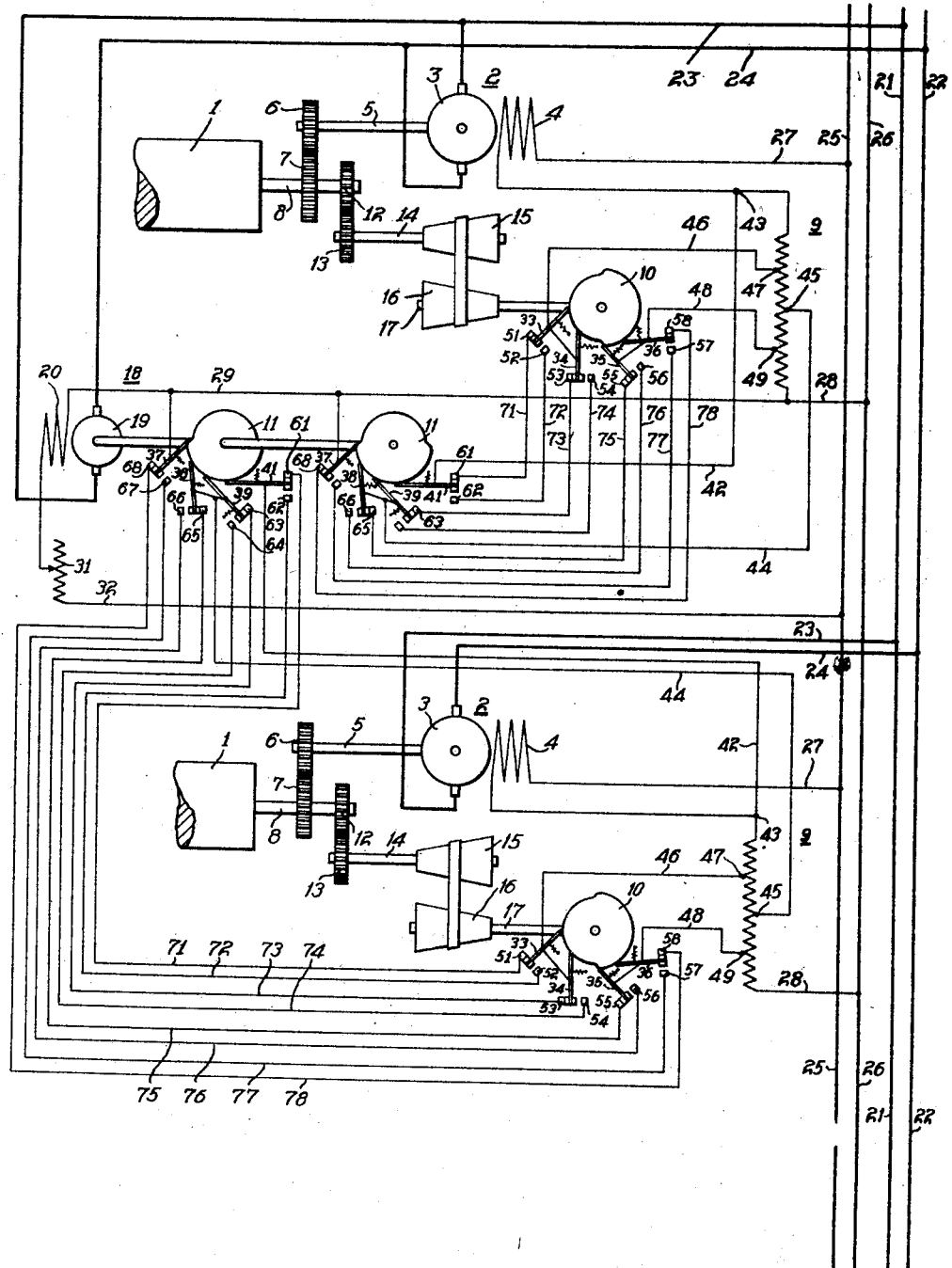
WITNESSES:
INVENTOR
William E. Menzies.
BY
ATTORNEY Patented Mar. 19, 1929.

1,705,672

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 14, 1923. Serial No. 645,280.

My invention relates to regulator systems and more particularly to regulator systems for maintaining a number of machines at definite relative speeds that are variable at will.

One object of my invention is to provide a regulator system that shall govern a speed of a number of motors and that shall maintain a substantially constant speed ratio between them.

Another object of my invention is to provide a regulator system of the above-indicated character in which the amount of correction of the speed upon each motor is directly proportional to its angular displacement from normal with respect to a master speed reference means.

In many industrial applications, it is essential to operate a number of rotating members at a constant speed, or to maintain a constant speed ratio, variable at will, between a number of moving parts. Thus in the case of paper making machines, it is necessary that the speed ratios between the several paper rolls be maintained constant in order to prevent breaking the paper that is passed between the sets of rolls.

In a regulator system constructed in accordance with my invention as applied to a paper making machine, each set of paper rolls is individually motor driven and the various motors are so controlled as to maintain a substantially constant speed ratio between them.

In the accompanying drawing, the single figure is a diagrammatic view of a system of control organized in accordance with my invention for maintaining a plurality of machines at different rates of speeds and at the same time affording a convenient means for varying the speed relation.

My invention comprises individually driven members, each member being driven by a direct current motor having an armature and a field winding. In the circuit of the field winding, a resistor is connected. A series of contact members connected to certain portions of the resistor are actuated in accordance with the speed of the driven motor. Another series of contact members also connected to said resistor are actuated in accordance with the speed of a master speed reference means. These two sets of contact members are interconnected in such manner that a circuit for shunting a portion of the resistor passes through contact members in each series.

Referring to the accompanying drawing, a plurality of sets of rolls 1, only two of which are shown for the sake of simplicity, are driven by direct current motors 2. Each motor 2 is provided with an armature 3 and a field winding 4 and drives the paper roll by means of a shaft 5, gear wheels 6 and 7 and shaft 8.

In the field circuit of the motor 2 is connected a resistor 9, portions of which are adapted to be intermittently short circuited through the cooperation of cam members 10 and 11, as will be further explained. The cam 10 is driven in accordance with the speed of the paper roll 1 through gear wheels 12 and 13, shaft 14, cone pulleys 15 and 16 and shaft 17. The cam 11 is driven in accordance with the speed of a motor 18 termed a master motor and which acts as a master speed-reference means for controlling the speeds of the several roll motors 2.

The master motor 18 is provided with an armature 19 and a field winding 20. The armature 19 is connected to variable-voltage direct current conductors or bus bars 21 and 22 by means of the conductors 23 and 24. The armatures 3 of the roll motors 2 are also connected to the variable voltage bus bars 21 and 22 by means of conductors 23 and 24. The field winding 20 of the master motor is connected to constant-voltage direct current supply conductors or bus bars 25 and 26, by means of conductors 29 and 32. A manually operated rheostat 31 is provided in the field circuit.

One side of the motor field winding 4 is connected by means of conductors 27 to one of the constant potential direct current supply conductors 25. The other side of the field winding 4 is connected through the resistor 9 to the constant potential supply conductor 26 by means of the conductor 28.

The cam member 10 operates a series of contact arms or double-throw reversing switches 33, 34, 35, and 36. The cam 11 operates a similar series of contact arms or reversing switches 37, 38, 39 and 41. Contact arm 41 is connected by means of a conductor 42 to one terminal 43 of the resistor 9. Contact arms 38 and 39 are connected by means of the conductor 44 to a point 45 substantially midway of the resistor 9. Contact arm 37 is connected by means of the conductor 29 with the other terminal of the resistor 9 which is connected to the supply conductor 26.

The contact arms 33 and 34 are connected, by means of conductor 46, to a point 47 on the resistor 9 intermediate the terminal 43 and the point 45. The contact arms 35 and 36 are connected by means of conductor 48 to a point 49 intermediate the point 45 and the other terminal of the resistor 9.

The contact arms 33 and 34, and 35 and 36, are yieldingly held in engagement with the surface of the cam member 10 as by springs and are adapted to contact, respectively, with pairs of contact members 51 and 52, 53 and 54, 55 and 56, 57 and 58. Similarly the contact arms 37, 38, 39 and 41 yieldingly engage the cam 11 and are respectively adapted to make contact with a pair of contact members 68 and 67, 66 and 65, 64 and 63, 62 and 61. The contact members 51 and 61 are connected by means of a conductor 71. Similarly contact members 52, 53, 54, 55, 56, 57 and 58 are connected respectively to contact members 62 and 63, 64, 65, 67, 68, by means of conductors 72 to 78.

It will appear from the structure described that the entire machine comprising the several rolls and the master speed-reference means may be varied in speed by varying the voltage of the supply conductors or bus bars 21 and 22 as for example, by the well known Ward-Leonard system. It will appear, also that a variation in the speed of the motor 2 with respect to the master motor 18 will vary the effective value of the resistor 9 by varying the duration of short-circuiting the several portions of the resistor by means of cams 10 and 11. In the positions shown, cam 10 has a phase displacement of 90° behind cam 11 assuming a clock-wise rotation of the cam members.

Tracing the control circuits for this position of the cams beginning at terminal 43, through conductors 42, contact arm 41, contact member 61, conductor 71, contact members 51, contact arm 33 and conductor 46, it is apparent that the section from point 43 to point 47 of the resistor 9 is short-circuited. It is likewise apparent in tracing from point 47 through conductor 46, contact arm 34, contact members 53 and 63, contact arm 39, and conductor 44 to the point 45 that the section from point 47 to point 45 of resistor 9 is likewise short circuited. Likewise by tracing similar circuits for the sections between points 45 and 49 to conductor 28, it will be apparent that these sections are also short-circuited.

It will likewise be apparent that, if the cam 10 were 180° in advance of the position shown, or at a phase angle of 90° ahead of the cam 11, the contact arms 33, 34, 35 and 36 would each be in the position opposite from that illustrated and thus the several sections of resistor 9 would not be short-circuited, thus giving the full effect of the resistor 9 to the field circuit of the motor 2. It will also be apparent upon study of the diagram that, when the cam 10 is in phase with the cam 11, there will be an average effective value of the resistor 9 intermediate that of the two extremes previously described.

The tendency is, therefore, to proportionally increase the duration of time of short-circuiting the several segments of the resistor 9 as the cam 10 falls behind the cam 11 in phase displacement, and to proportionally shorten the duration of time of short-circuiting the various segments as the cam 10 advances with respect to the cam 11. As the motor 2 descreases its speed with respect to the master motor 18, the cams 10 and 11 cooperate to weaken the field of the motor 2 and thus increase its speed while if the motor 2 tends to run ahead of the master motor 18, the cams cooperate to strengthen the field of the motor 2 and thus decrease its speed.

The shaft of the master motor may have a separate cam 11 for each section motor to be controlled or, as is obvious, a single master cam may be provided with a number of contacts on each contact arm which may serve to establish connection with several resistors connected in the field circuits of section motors to be regulated.

The above described structural details are diagrammatically shown, serving only to illustrate the principle of operation of the system. Other modifications in the system and in the arrangement and location of parts may be made within the spirit and scope of my invention and such modifications are intended to be covered by the appended claims.

I claim as my invention:—

1. In a regulator system, the combination with a section motor to be regulated, and a master speed-reference means, of a control circuit, a plurality of double-throw contactors in said control circuit adapted to be actuated in accordance with the speed of said section motor, and a plurality of double-throw contactors in said control circuit adapted to be actuated in accordance with the speed of said master speed-reference means.

2. In a regulator system, the combination with a section motor to be regulated and having a field circuit with a resistor therein, and a master speed-reference means, of a control circuit, a plurality of double-throw contactors in said control circuit actuated in accordance with the speed of said motor, a plurality of double-throw contactors in said control circuit actuated in accordance with the speed of said master speed-reference means, said contactors cooperating to short-circuit said field resistor for varying intervals of time.

3. In a regulator system, the combination with a section motor to be regulated and having a field circuit with a resistor therein, and a master speed-reference means, of a plurality of control circuits, a plurality of double-throw contactors in said control circuits actuated in accordance with the speed of said motor, a plurality of double-throw contactors in said control circuits actuated in accordance with the speed of said master-speed-reference means, said contactors cooperating to short-circuit portions of said resistor for varying intervals of time.

4. In a regulator system, the combination with a motor to be regulated and having a field circuit with a resistor therein, and a master speed-reference means, of a plurality of double-throw contactors for controlling said resistor, certain of said contactors being intermittently actuated in accordance with the speed of said motor, and other of said contactors being intermittently actuated in accordance with the speed of said master speed-reference means.

5. In a regulator system, a master speed-reference means, a motor to be regulated, said motor having a field circuit, a resistor in said field circuit, means for intermittently short-circuiting a portion of said resistor comprising a pair of double-throw reversing switches, means for actuating one of said reversing switches in accordance with the speed of said master speed-reference means, and means for actuating the other of said reversing switches in accordance with the speed of said motor.

6. In a regulator system, a master speed-reference means, a motor to be regulated, said motor having a field circuit, a resistor in said field circuit, means for short-circuiting portions of said resistor comprising pairs of electrically connected double-throw reversing switches, means for intermittently reversing one member of the pairs of switches in accordance with the speed of said master speed-reference means and means for intermittently reversing the other switches in accordance with the speed of said motor.

7. In a regulator system, a master speed-reference means, a motor to be regulated, said motor having a field circuit, a resistor in said field circuit, a pair of reversing switches, a conductor from said resistor to one of said reversing switches, a conductor from said resistor to the other of said reversing switches, a pair of conductors connected between said reversing switches, means for actuating one of said reversing switches in accordance with the speed of said master speed-reference means and means for actuating the other of said reversing switches in accordance with the speed of said motor.

8. In a regulator system, a master speed-reference means, a motor to be regulated comprising a field winding, a resistor in circuit with said field winding, cam-operated means for intermittently short-circuiting a portion of said resistor comprising a double-throw contactor actuated in accordance with the speed of said master speed-reference means and a double-throw contactor actuated in accordance with the speed of said motor.

In testimony whereof, I have hereunto subscribed my name this 6th day of June, 1923.

WILLIAM E. MENZIES.